United States Patent [19]
Elsner et al.

[11] Patent Number: 6,003,475
[45] Date of Patent: Dec. 21, 1999

[54] PLANT FOR THE COMBUSTION OF FOSSIL FUEL AND BIOMATERIAL OR WASTE

[75] Inventors: Birgit Elsner, Fellbach; Hellmuth Bruggemann, Ostfildern; Uwe Krogmann, Pleidelsheim; Tino-Martin Marling, Filderstadt; Gerhard Schroth, Stuttgart; Walter Vogt, Ditzingen, all of Germany

[73] Assignee: Alstom Energy Systems GmbH, Stuttgart, Germany

[21] Appl. No.: 09/211,949

[22] Filed: Dec. 15, 1998

[30] Foreign Application Priority Data

Dec. 16, 1997 [DE] Germany ............................ 197 55 907

[51] Int. Cl.⁶ .................................................... B09B 3/00
[52] U.S. Cl. .............................. 122/2; 122/4 D; 122/7 R; 110/245
[58] Field of Search .................................. 122/2, 4 D, 7 R; 110/234, 245, 269, 270; 60/39.12, 39.464, 39.182

[56] References Cited

U.S. PATENT DOCUMENTS

| | | | |
|---|---|---|---|
| 4,502,397 | 3/1985 | Hochmuth | 122/2 |
| 4,614,167 | 9/1986 | Bergkvist | 122/4 D |
| 5,269,263 | 12/1993 | Garcia-Mallol | 122/4 D |

*Primary Examiner*—Philip H. Leung
*Assistant Examiner*—Gregory A. Wilson
*Attorney, Agent, or Firm*—Alix, Yale & Ristas, LLP

[57] ABSTRACT

A power plant which combusts fossil fuel and biomaterial or waste includes a large boiler plant having at least one device for the combustion of fossil fuel. At least one additional combustion device is connected to the large boiler plant via at least one connection channel. The additional combustion device includes a grate hearth for the combustion of biomaterial or waste. The additional combustion device includes at least one heat exchanger device which is integrated into the water/steam circuit of the large boiler plant.

14 Claims, 2 Drawing Sheets

PLANT FOR THE COMBUSTION OF FOSSIL FUEL AND BIOMATERIAL OR WASTE

BACKGROUND OF THE INVENTION

This invention relates generally to a plant for the combustion of fossil fuel and biomaterial or waste. More particularly, the present invention relates to a plant in which fossil fuel is combusted in a large boiler plant of a power plant, biomaterial or waste is combusted in an additional combustion device configured as a forehearth to the large boiler plant, and flue gas arising in the additional combustion device is introduced into the large boiler plant.

In addition to waste, which may contain organic and inorganic waste materials, only organic waste materials or biomaterials (also denoted as biomass), such as wood wastes of all types, bagasse, peanut and other shells or secondary biomaterials such as reeds, straw, underbrush, etc. can be combusted in such forehearths. On the one hand, fossil fuel can be substituted by the biomaterial by burning such biomaterials in forehearths of large boiler plants operating with fossil fuel, and thus $CO_2$ emission will be reduced, and, on the other hand, valuable landfill space will be spared.

DE 4,442,136 A1 discloses a power plant designed for burning fossil fuel having a water/steam circuit for decoupling of heat, a large boiler plant, and an additional combustion device, designed for combustion of waste, which acts as a forehearth to the large boiler plant. A grate hearth is utilized as the additional combustion device. The flue gas arising in the additional combustion device is conducted into the large boiler plant, whereby the flue gas leaving the large boiler plant derives from a maximum of 30% from the grate hearth or the forehearth firing and a minimum of 70% from the combustion of fossil fuel. This device may utilize nearly unprocessed waste while assuring that the legally valid conditions for the flue gas are maintained. This applies particularly to maintaining HCl and CO limiting values and the burning off of possible other pyrolysis products.

DE 4,312,900 A1 discloses a coal dust-fired steam boiler, in which the biomaterials are fed into the forehearth for burning, and the hot gases produced thereby are conveyed to the combustion chamber of the steam boiler. The forehearth is operated directly with the system of hot air, pilot burner, pulverizer, principal burner, combustion chamber, heating surfaces, flue gas and ash removal, as well as with the safety and emergency connections of the steam boiler. The patent also discloses that heating surfaces can be arranged in the forehearth, which are integrated in the heating-surface system of the steam boiler or in a heat-removal system.

For the operation of such a plant for combustion of fossil fuel and biomaterial or waste however, considerable effort must be expended to obtain an optimal efficiency of the plant, to achieve operating costs that are as small as possible for preparing the biomaterial or waste "fuel", to minimize investment costs, and to obtain a smaller space requirement for the plant. All previously known measures represent only a partial solution of an individual problem and do not offer a complete solution for all of these problems.

SUMMARY OF THE INVENTION

An object of the invention is to provide a power plant for the combustion of fossil fuel and biomaterial or waste, in which the fossil fuel is combusted in a large boiler plant, the biomaterial or waste in an additional combustion device formed as a forehearth to the large boiler plant, and flue gas arising in the additional combustion device is conducted into the large boiler plant, in which all of the above-given criteria, such as optimal efficiency, etc., are substantially fulfilled.

This object is achieved by the use of a firing grate in the additional combustion device as compared with combustion in suspension (fluidized bed firing among others). With such a firing grate, it is possible to be able to burn biomaterials or waste that is nearly unprocessed in the additional combustion device. Operating in this manner, investment and operating costs are essentially reduced (50% and more).

This object is also achieved by the application of heat exchanger devices in the additional combustion device. Using such a heat exchanger, the firing capacity of the additional combustion device can be increased and a smaller connection channel (up to 50% smaller) can be installed between the additional combustion device and the large boiler plant due to heat removal from the flue gas. This results in smaller initial investment costs, smaller maintenance costs, and smaller spatial requirement relative to the connection channel.

This object is further achieved by optimizing heat utilization of the fuel heat in the combustion of biomaterial or waste.

The heat exchanger device in the additional combustion device preferably is formed as a feed-water preheater or as an additional feedwater preheater in the water/steam circuit of the large boiler plant. The heat exchanger device is then provided as an additional feed-water preheater (ECO), if an ECO is already present in the water/steam circuit of the large boiler plant. If this is not the case, the heat exchanger device can take over the function of the ECO. This preferred arrangement is particularly suitable for large boiler plants, which are designed as once-through boilers.

The heat exchanger device of the additional combustion device may be arranged upstream or downstream from the ECO of the large boiler plant in the water/steam circuit of the large boiler plant.

In another preferred manner, the heat exchanger device in the additional combustion device is configured as an evaporator, which is arranged in the water/steam circuit of the large boiler plant parallel to the evaporator of the large boiler plant. This preferred arrangement is particularly suitable for large boiler plants, which are designed as natural circulation boilers (also thermal circulation boilers).

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
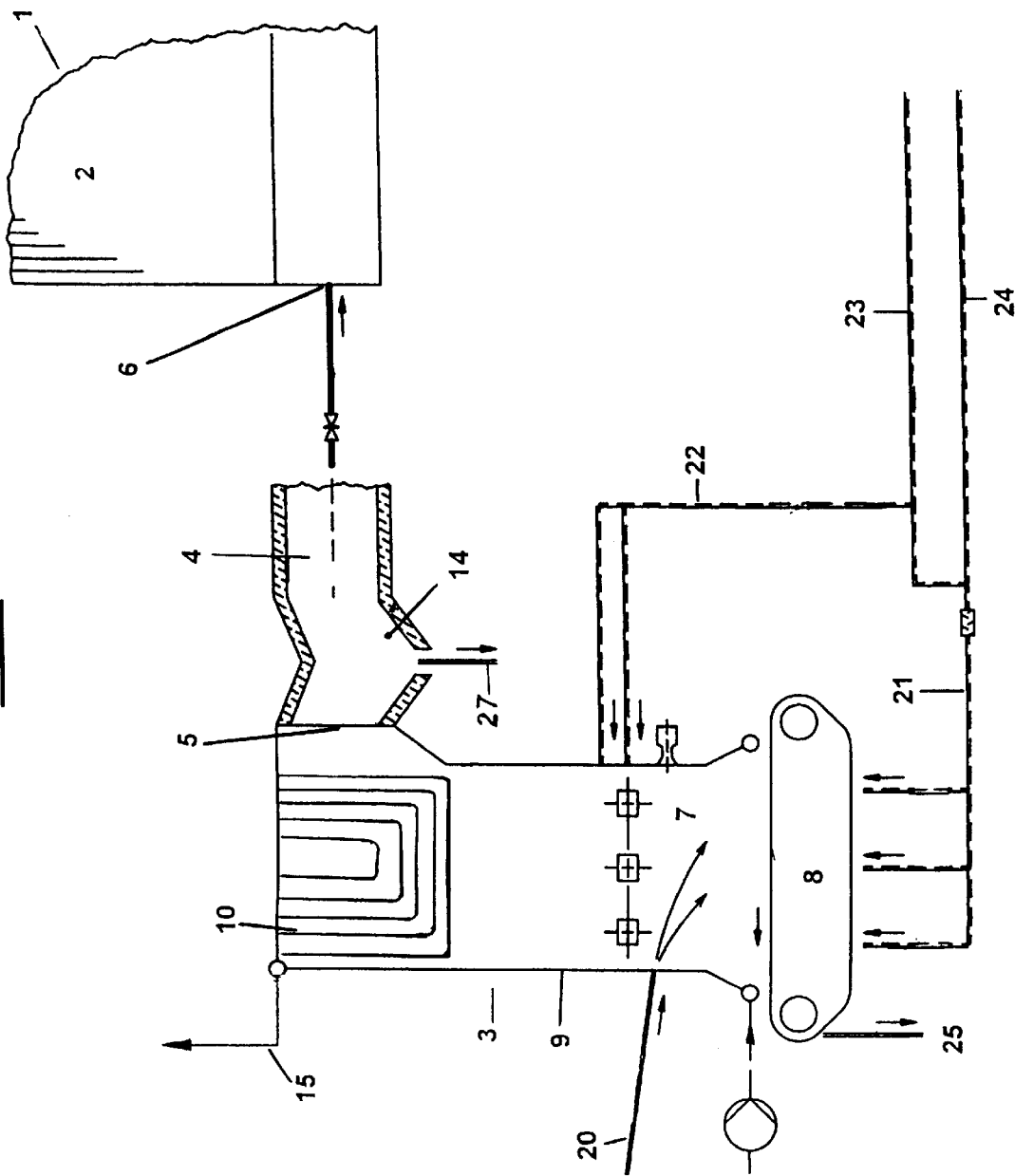
FIG. 1 is a very simplified schematic drawing of a large boiler plant of a power plant having an additional combustion device.

With reference to the drawings wherein like numerals represent like parts throughout the several figures, a plant for the combustion of fossil fuel and biomaterial or waste in accordance with the present invention includes a large boiler plant 1 of a power plant for the firing of a fossil fuel in the known way (FIG. 1). In the example presented, coal is combusted by means of a coal-dust burner (not shown) in combustion chamber 2 of the large boiler plant 1. The heat energy that is released is introduced into the water/steam circuit 15 of the large boiler plant by means of vaporizer and superheater heating surfaces (not shown), and the energy is exploited by introduction into a steam turbine (not shown).

The combustion exhaust gases arising in the combustion of coal are output downstream of large boiler plant 1 and are refined in flue-gas refining plants, in the known way according to standards or emission regulations. An additional combustion device 3 is connected upstream of large boiler plant 1 and joined with it by connection channel 4.

Instead of a single additional combustion device 3, several additional combustion devices 3 may also be provided, each time connected with large boiler plant 1.

Biomaterial is fed into additional combustion device 3 by fuel feed 20 according to one partial feature of the invention to a grate 8 and is combusted in the presence of primary and secondary combustion air 21, 22 in combustion chamber 7. The slag [cinders] arising in the combustion of the biomaterial is disposed of through slag outlet 25.

Fuel feed 20 may be operated mechanically by means of known ejecting devices or may be operated pneumatically.

The biomaterial or the biomass or the waste can be fed to the firing in large pieces due to the combustion of the biomaterial or waste on grate 8. Therefore, a special pulverization by pulverizing machines can be substantially eliminated. Known devices, such as for example, traveling grates, feed grates, among others, can be utilized as grate 8.

Combustion chamber 7 of additional combustion device 3 is essentially vertical and preferably has rectangular cross section. The additional combustion device 3 also includes a heat exchanger device 9, 10. These heat exchanger devices can be external pipe walls 9, which are formed as heating surfaces and bound combustion chamber 7, and/or convective heat exchanger devices or bulkhead heating surfaces 10, which are arranged in the upper region of combustion chamber 7. Additional combustion device 3 according to FIG. 1 is designed, for example, with external pipe walls 9 and bulkhead heating surfaces 10. The heat exchanger device according to FIG. 1 is integrated in the water/steam circuit 15 of large boiler plant 1. The external pipe walls 9 are preferably designed gas-tight.

The water/steam circuit 15 of large boiler plant 1 thus absorbs a portion of the heat released in the combustion of biomaterial in combustion chamber 7 of additional combustion device 3 by the heating surfaces of external pipe walls 9 and bulkhead heating surfaces 10, whereby the heat is released as radiant and/or contact heat. 30 Subsequently, the flue gas or combustion off-gas, having had a part of its heat removed, leaves the additional combustion device 3 through flue gas outlet 5. The flue gas enters combustion chamber 2 of large boiler plant 1 via connection channel 4 and inlet 6 and is integrated into the combustion process of large boiler plant 1. The flue gas can be introduced through one or more inlet openings into combustion chamber 2. In another preferred arrangement, in which a sufficient underpressure prevails for a problem-free introduction of flue gas, the flue gas may be introduced into the funnel region (not shown) of combustion chamber 2. Instead of one connection channel 4 and one outlet 5 as shown in FIG. 1, several, preferably two, outlets 5 and connection channels 4 can be arranged. Correspondingly, several inlets 6 are then provided. Further, inlets 6 and connection channel 4 may be integrated into the funnel region of combustion chamber 2.

The corresponding heat equivalent of fossil fuel can be spared by the measure that a portion of the liberated heat (at least 90%) in combustion chamber 7 is delivered to heating surfaces 9, 10.

In the example presented, the biomaterial used substitutes for approximately 10% of the fuel that is fired in large boiler plant 1, or replaces approximately 100 $MW_{th}$. These values can be modified as needed.

Further, the measure leads to a smaller volume of flue gas and proceeding from this to smaller dimensions of the connection channel 4 or connection channels 4.

Connection channel 4 is provided in the known way on the inside with a suitable temperature-resistant and erosion-resistant lining and on the outside with suitable insulation.

The flue gas exiting from additional combustion device 3 through outlet 5 can be cleaned of fly ash and, if necessary, uncombusted material, by a cyclone separator 14, before it preferably reaches combustion chamber 2 of large boiler plant 1 through connection channel 4 and through inlet 6.

The fly ash and possible uncombusted material separated in cyclone separator 14 may be further fed into combustion chamber 7 or on the grate of additional combustion device 3 through solids outlet 27 and a line 28, which is not shown. The air of combustion 23 necessary for the combustion of the biomaterial can be taken from the pre-heated air of combustion prepared for the combustion of the fossil fuel in large boiler plant 1 on the side of the flow center behind air pre-heater (not shown). Depending on the requirements, combustion air can be introduced into additional combustion device 3 as primary, secondary, tertiary as well as burnt-out air.

Further, the pre-heated air of combustion 23 can be mixed with cold gas 24, which is derived on the side of the flue gas downstream of the air pre-heater (not shown) from the off-gas channel (not shown) of large boiler plant 1.

The flue gas is sucked out of combustion chamber 7 into combustion chamber 2 by the underpressure present in the lower region of combustion chamber 2. In the case of overpressure firings (e.g., oil-fired and gas-fired boilers, waste boilers, etc.) in combustion chamber 2, the air of combustion 23 as well as the cold gas 24 possibly mixed in must be fed into combustion chamber 7 by an intrinsic fan (not shown) having a higher pressure than combustion chamber 2.

Figure 3:
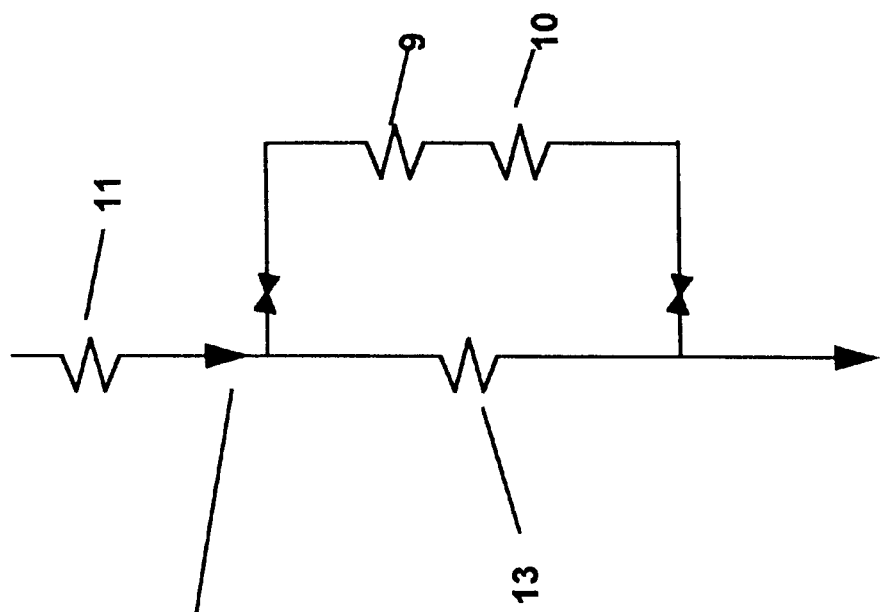
FIG. 3 is a schematic partial section of an alternate embodiment of the water/steam circuit of FIG. 2.
Figure 2:
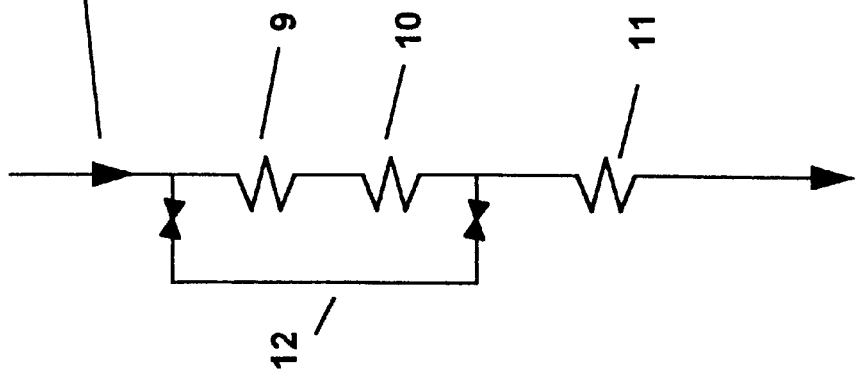
FIG. 2 is a schematic partial section of the water/steam circuit of FIG. 1.

FIGS. 2 and 3 show schematically the integration of heat exchanger devices 9, 10 of additional combustion device 3 in the water/steam circuit 15 of large boiler plant 1. In FIG. 2, the operating medium, water/steam, flows through the heating surfaces of the external pipe walls 9 and then the bulkhead heating surfaces 10 and takes up a part of the heat that is released in the combustion of biomaterial in additional combustion device 3. Heat exchanger devices 9, 10 are preferably used as feed-water pre-heaters or as additional feed-water preheating devices in the water/steam circuit 15. If water/steam circuit 15 of large boiler plant 1 already has an ECO 11, then heat exchanger devices 9, 10 will be utilized as additional feedwater pre-heating devices. This preferred arrangement is particularly suitable for large boiler plants 1, which are designed as once-through steam generators.

Heat exchanger devices 9, 10 of additional combustion device 3, as shown in FIG. 2, may lie upstream or also downstream of the ECO 11 in the water/steam circuit 15 of large boiler plant 1.

After heat coupling by means of heat exchanger devices 9, 10, the working medium reaches the other, usually following, heat exchanger devices (not shown) of water/steam circuit 15 of large boiler plant 1. The number of bulkhead heating surfaces 10 can be selected as needed.

In cases where the additional combustion device 3 is not in operation, the working medium can be conducted in water/steam circuit 15 through bypass line 12, bypassing heat exchanger devices 9, 10.

Heat exchanger devices 9, 10 may be designed in another preferred way as an evaporator, which is arranged in water/steam circuit 15 parallel to evaporator 13 of large boiler plant 1 (FIG. 3). This preferred arrangement is particularly suitable for large boiler plants 1, which are designed as natural circulation steam generators.

The above-named water/steam-side connections of heat exchanger devices 9, 10 of additional combustion device 3 that have been shown according to FIGS. 2 and 3, along with large boiler plant 1 make possible an optimum heat utilization for combustion of biomaterial in such a plant.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Plant for the combustion of fossil fuel and biomaterial or waste, comprising:
   a large boiler plant of a power plant, the boiler plant including at least one combustion chamber for the combustion of fossil fuel and a water/steam circuit;
   at least one additional combustion device having a combustion chamber including a grate hearth for the combustion of biomaterial or waste;
   at least one connection channel connecting the combustion chamber of the additional combustion device with large boiler plant; and
   at least one heat exchanger device arranged in the additional combustion device, the heat exchanger device being integrated in the water/steam circuit of large boiler plant.

2. Plant according to claim 1 wherein the heat exchanger device is configured as a feed-water preheater in the water/steam circuit of the large boiler plant.

3. Plant according to claim 1 wherein the water/steam circuit of the large boiler plant includes an integrated feed-water pre-heater and the heat exchanger device is configured as an additional feed-water preheater in the water/steam circuit of the large boiler.

4. Plant according to claim 3 wherein the heat exchanger device is arranged upstream of the feed-water pre-heater integrated in the water/steam circuit of the large boiler plant.

5. Plant according to claim 3 wherein the heat exchanger device is arranged downstream of the feed-water preheater integrated in the water/steam circuit of the large boiler plant.

6. Plant according to claim 1 wherein the water/steam circuit is formed with a bypass line bypassing the heat exchanger device.

7. Plant according to claim 1 wherein the large boiler plant includes an evaporator and the heat exchanger device is designed as an evaporator and is arranged in the water/steam circuit of the large boiler plant parallel to the evaporator of the large boiler plant.

8. Plant according to claim 1 wherein the heat exchanger device is formed as an external pipe wall heating surface partially encompassing the combustion chamber.

9. Plant according to claim 1 wherein the heat exchanger device comprises at least one convective heating surface.

10. Plant according to claim 9 wherein the convective heating surface comprises a bulkhead heating surface.

11. Plant according to claim 1 wherein the connection channel is integrated in the combustion chamber of the large boiler plant.

12. Plant according to claim 11 wherein the combustion chamber of the large boiler plant includes a funnel region and the connection channel is integrated into the funnel region.

13. Plant according to claim 1 wherein the connection channel includes a cyclone separator.

14. Plant according to claim 13 wherein the cyclone separator includes a solids outlet of cyclone separator which is joined with the combustion chamber of the additional combustion device by a line.

* * * * *